United States Patent [19]

Lumbis

[11] Patent Number: 5,630,565
[45] Date of Patent: May 20, 1997

[54] LOCOMOTIVE M. U. TRAINLINE/JUMPER FOR EP BRAKE APPLICATION

[75] Inventor: Anthony W. Lumbis, Watertown, N.Y.

[73] Assignee: New York Air Brake Corporation, Watertown, N.Y.

[21] Appl. No.: 572,624

[22] Filed: Dec. 14, 1995

[51] Int. Cl.⁶ .................................................. B61C 17/12
[52] U.S. Cl. .................... 246/182 B; 246/187 C; 303/3; 303/16
[58] Field of Search ................... 246/182 R, 182 C, 246/187 C, 189, 190; 303/3, 15, 16, 17; 105/61

[56] References Cited

U.S. PATENT DOCUMENTS

| | | |
|---|---|---|
| 2,993,199 | 7/1961 | Browne et al. |
| 3,651,765 | 3/1972 | Grundy .................... 105/61 |
| 3,696,758 | 10/1972 | Godinez, Jr. .................... 105/61 |
| 4,316,640 | 2/1982 | Cripe .................... 303/20 |
| 4,344,364 | 8/1982 | Nickles et al. .................... 246/187 C |
| 4,652,057 | 3/1987 | Engle et al. .................... 303/3 |
| 4,971,399 | 11/1990 | Balukin et al. .................... 303/33 |
| 4,994,564 | 2/1991 | Balukin et al. .................... 303/33 |
| 5,249,125 | 9/1993 | Root et al. .................... 246/182 B |
| 5,315,520 | 5/1994 | Drake et al. .................... 246/182 B |
| 5,507,457 | 4/1996 | Kull .................... 246/169 R |

*Primary Examiner*—S. Joseph Morano
*Attorney, Agent, or Firm*—Barnes & Thornburg

[57] ABSTRACT

An EP controller, which is located on the leading locomotive, is connected by a cable to the leading end trainline connector of the lead locomotive. This powers the EP controller and provides communication by the EP controller over the trainline. A second cable connects the EP line of the first car in the train to the trailing end trainline connector of the last locomotive for providing communication between the EP controller and the electro-pneumatic brakes on each car over the trainline and the EP line.

11 Claims, 2 Drawing Sheets

LOCOMOTIVE M. U. TRAINLINE/JUMPER FOR EP BRAKE APPLICATION

BACKGROUND AND SUMMARY OF THE INVENTION

The present invention relates generally to electro-pneumatic brakes on trains and more specifically to a method of connecting and interconnecting the controller of the locomotive to the electro-pneumatic brakes on the cars.

The installation of electro-pneumatic (EP) operated brake equipment on railcars and the train is a relatively straight forward procedure. The control equipment and electronic trainline cables are permanently installed on the individual cars. As long as these cars are operated as a unit train with a locomotive that has also been modified to interface with the EP train, the brake system can perform in its electro-pneumatic mode. Keeping the modified locomotive and cars together as a unit train, in most cases, it is not a problem for railroads. However, modifying and then dedicating these modified locomotives to a single unit train, does present problems for the railroads. This increases the cost of operation in relation to other load factors. Also, the industry has decided to provide electro-pneumatic brakes on all cars, including freight cars. Unless all of the locomotives are modified or some are modified and dedicated EP service, the train cannot be operated in its electro-pneumatic mode.

Thus, as an object of the present invention to provide a simplified modification of locomotives for electro-pneumatic brake service.

Another object of the present invention is to provide a modification of locomotives for electro-pneumatic brake systems without the need for permanent rewiring.

These and other objects are achieved by using the existing electric trainline connectors on each end of the locomotives as a connection point for the electro-pneumatic controllers on the locomotive and the connection of the electro-pneumatic line of the cars to the locomotive consist.

Each train includes one or more locomotives and a plurality of cars. Each locomotive includes a leading and trailing end electrical trainline connector for interconnecting power and control lines to an adjacent locomotive. Each car on the electro-pneumatic train is serial connected electrically to an adjacent car forming an EP line. Each car includes an electro-pneumatic brake controlled by an EP controller in a locomotive over the EP line. The EP controller, which preferably is located on the leading locomotive, is connected by a cable to the leading end trainline connector of the lead locomotive. This powers the EP controller and provides communication by the EP controller over the trainline. A second cable connects the EP line of the first car in the train to the trailing end trainline connector of the last locomotive for providing communication between the EP controller and the electro-pneumatic brakes on each car over the trainline and the EP line. The trainline is a standard 27 pin multiple unit trainline. Alternatively, the EP controller is connected to a cable to an end trainline connector to receive power and is connected by a cable directly to the EP line of the first car.

The first cable connects a pair of power lines in the trainline to the controller. The first cable also connects a pair of control lines, at least one of which is not used by a locomotive control, to the EP controller for communication. The second cable connects the pair of control lines to the EP line. Preferably, a pair of unused control lines are used by the EP controller and the EP line. If used control trainline lines have to be used, they generally carry locomotive DC signals. The EP controller would then transmit AC control signals on the trainlines. Thus, the locomotive circuits connected to the used control trainlines are responsive only to the DC signals and the electro-pneumatic brakes on each of the cars are only responsive to the AC signals. The EP controller can also transmit power to the EP lines over the trainlines.

DETAILED DESCRIPTION OF THE PREFERRED EMBODIMENT

Figure 1:
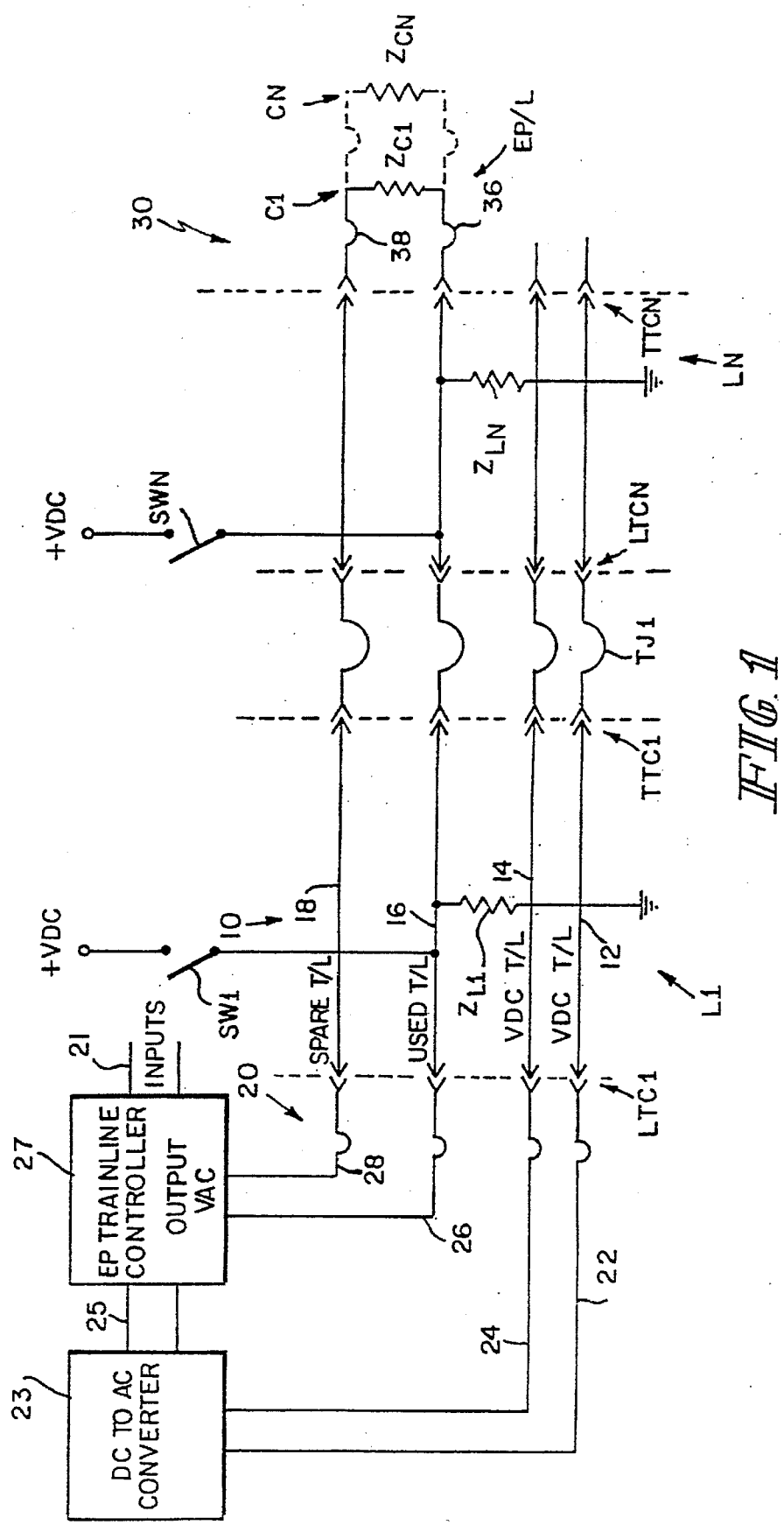
FIG. 1 shows a schematic of a locomotive multiple unit trainline/jumper for electro-pneumatic brake applications using at least one unused line incorporated in the principles of the present invention.
Figure 2:
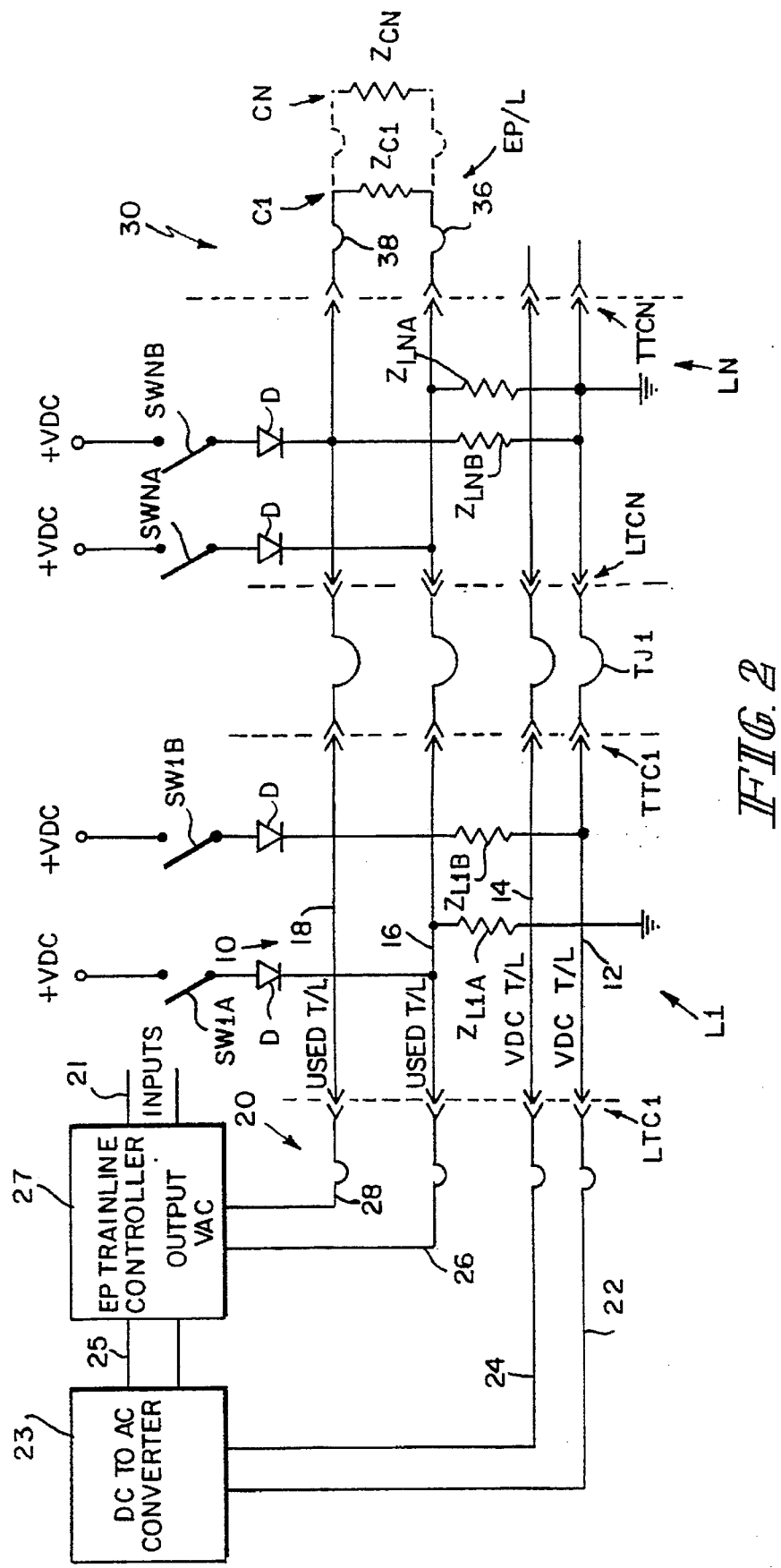
FIG. 2 shows a schematic of a locomotive multiple unit trainline/jumper for electro-pneumatic brake applications using two used lines.

A schematic of a trainline and the connections of cars and an electro-pneumatic train are illustrated in FIGS. 1 and 2. As illustrated thereto, there are two locomotives, L1 and LN, and cars having numeral C1 ... CN. The locomotives are L1 ... LN include a trainline T/L illustrated as having at least a negative DC voltage 12, a positive DC voltage line 14, a used signal line 16 and a spare or unused signal line 18. Using standard AAR practices, the negative trainline 12 is known as line #4 and the positive trainline 14 has the recognized number #13. The negative power line 12 is connected to ground in each of the locomotives. The impedance of the each of the existing locomotive trainline loads is represented by $Z_{L1} \ldots Z_{LN}$. The locomotive control signals are DC signals and are applied to the control trainlines by switches, SW1 through SWN in the individual locomotives.

Each of the locomotives includes a leading trainline connector LTC1 ... LTCN and a trailing trainline connector TTC1 ... TTCN. A trainline jumper TJ connects the trailing trainline connection TTC from one locomotive to the leading trainline connector LTC of the adjacent locomotive. Although two locomotives L1 and LN are shown, the train may include only one locomotive or a plurality of locomotives forming a consist, each connected by an appropriate jumper TJ.

The leading locomotive L1 includes an EP trainline controller 27 which provides EP control signals and is powered by a DC to AC converter 23 and connected thereto by lines 25. Inputs 21 receive the necessary information from the locomotive to control the car brakes. These may be electrical or pneumatic inputs. The inputs may be received by hard wire or wave communication. The present system for conveniently connecting the EP controller 27 and its power source 23 to the locomotive includes a cable 20 connecting to the leading trainline connector TC1 of the lead locomotive to the DC to AC converter 23 and the EP trainline controller 27. The cable includes a pair of power cables 22 and 24 connecting the trainline power line 12 and 14 to the DC to AC converter 23. The cable also includes a pair of EP control lines 26 and 28 connecting the output of the EP trainline controller 27 to a pair of control trainlines 16 and 18. At least one of the control trainlines 18 is unused in FIG. 1.

The leading car C1 of the train is connected to the terminal trainline connector TTCN of the last car by a jumper or cable 30. The cable 30 includes lines 36 and 38 connected to control lines 16 and 18 of the trainline to connect the EP trainline controller 27 to the EP trainline EP/L of the serial connected cars, C1 through CN.

Preferably, a pair of spare control trainlines should be used. In this case, the EP trainline controller 27 can provide DC control signals. If a pair of unused or spare control trainlines are not available, preferably at least one of the control trainlines used by the EP train controller 27 should be unused as shown in FIG. 1. If only one control trainline is used trainline, it generally carries locomotive DC signals. The EP train controller 27 would then transmit an AC control signal on the trainlines 16, 18. Since the output of the EP controller is isolated from the locomotive battery negative or ground, the two circuits can operate independently. Additionally, this arrangement allows either AC or DC power to be transmitted over these same three lines 12, 16, 18 without adversely affecting each other.

In worse case situations, a pair of used control trainlines can be used for the EP communications as shown in FIG. 2. Each used trainline 16, 18 includes a respective switch SWIA and SWNB to apply the DC locomotive control signals. If both control trainlines 16, 18 are used trainlines, care must be taken in choosing them so that a circuit path is not established if they are both energized at the same time. This can be accomplished by choosing trainlines that cannot be energized at the same time, i.e. Forward and Reverse trainlines. Otherwise, diodes D shown in FIG. 2, or other additional isolation or protection circuitry, are installed to prevent a circuit from being established that would lead to the "shorting" of the T/L controller output. This method is not recommended since the main purpose of connecting the equipment to the existing trainlines is to eliminate the need for any additional wiring or modifications to the locomotive equipment.

Since the EP controller provides an alternating voltage output and the locomotive uses DC controls on the common control trainline TL, the locomotive elements to be controlled would be responsive only to DC and the electro-pneumatic apparatus on the individual cars would be responsive only to the AC signal. Thus, a sharing of the common control lines may be used.

Since the EP trainline controller 27 is providing an AC signal on the control trainline TL to the electro-pneumatic trainline EP/L, the individual cars may use this AC signal as not only a signal source for controlling the EP brakes, but also has a source of power. The individual cars C1 through CN only includes a battery which may be charged from the AC power signal.

As a typical example, the DC voltage available on the locomotive trainline and used as a signalling source ±75 volts. The EP trainline controller has an output of, for example, 160 volts AC. These are but mere examples of the presently used technology.

Although the EP trainline controller 27 and its DC to AC converter are shown in the leading locomotive, each locomotive or any other locomotive may include these two elements. Preferably, it is the EP trainline controller 27 in the leading locomotive that is connected to the unused leading trainline connector LTC.

If the EP trainline controller 27 is in the trailing locomotive, the lines 22 and 24 of cable 20 would be connected to the trailing connector TTCN and the output of the EP trainline controller 27 on lines 26, 28 would be connected directly to the EP lines of the cars. This would be a single or a pair of cables combining the function of cables 20 and 30 without using the control lines of the locomotive trainline TL. In this case, the EP trainline controller 27 can provide the DC control signals to the EP trainline. The inputs 21 of the EP trainline controller 21 would be received from the controlling or master locomotive, which may not be the locomotive the EP trainline controller 27 is on.

If the EP trainline controller is in only one of the other locomotives, an adaptor would be used to connect the cable 20 to the trainline jumper TJ between adjacent locomotives. Although this is not preferred, it is an alternative embodiment.

Although the present invention has been described and illustrated in detail, it is to be clearly understood that the same is byway of illustration and example only, and is not to be taken by way of limitation. The spirit and scope of the present invention are to be limited only by the terms of the appended claims.

What is claimed:

1. A train including at least one locomotive and a plurality of cars, said locomotive having a leading end and a trailing end electric trainline connector for interconnecting power and control lines to an adjacent locomotive, each car being serially connected electrically to an adjacent car forming an EP line and having an electropneumatic brake controlled by an EP controller in said locomotive over said EP line, including:

a first cable connecting said EP controller to said leading end trainline connector of said locomotive for powering said EP controller and providing communication by said EP controller over said trainline; and a second cable connecting said EP line of a first car in said train to said trailing end trainline connector for providing communication between said EP controller said electropneumatic brakes on each car over said trainline and EP line.

2. A train according to claim 1, wherein said train includes a plurality of locomotives interconnected by said trainline connectors to form a consist having a first and last locomotive; said first cable is connected to the leading end trainline connector of the first locomotive and said second cable is connected to the trailing end trainline connector of the last locomotive.

3. A train according to claim 1, wherein said trainline is a standard 27 pin multiple unit trainline.

4. A train according to claim 3, wherein said first cable connects a pair of power lines in said trainline to said EP controller and connects a pair of control lines in said train lines to said EP controller for communication; and said second cable connects said pair of control lines to said EP line.

5. A train according to claim 4, wherein at least one of said control lines is not used by a locomotive controller.

6. A train according to claim 1, wherein said first cable connects a pair of power lines in said trainline to said EP controller and connects a pair of control lines in said train lines to said EP controller for communication; and said second cable connects said pair of control lines to said EP line.

7. A train according to claim 6, wherein at least one of said control lines is not used by a locomotive controller.

8. A train according to claim 1, wherein:

said first cable connects a pair of power lines in said trainline to said EP controller and connects a pair of control lines used by a locomotive controller in said train lines to said EP controller for communication and said second cable connects said used lines to said EP line;

said control lines carry locomotive D.C. signals and EP controller A.C. signals; and locomotive circuits connected to said used train line is responsive only to said D.C. signals and said electropneumatic brake is only responsive to said A.C. signals.

9. A train according to claim 8, including isolation circuitry between said control lines and said locomotive controller.

10. A train according to claim 1, wherein said EP controller also transmits power to said EP line over said trainline.

11. A train including at least one locomotive and a plurality of cars, said locomotive having a leading end and a trailing end electric trainline connector for interconnecting power and control lines to an adjacent locomotive, each car being serially connected electrically to an adjacent car forming an EP line and having an electro-pneumatic brake controlled by an EP controller in said locomotive over said EP line, including:

a first cable connecting said EP controller to an end trainline connector of said locomotive for powering said EP controller; and a second cable connecting said EP line of a first car in said train to said EP controller for providing communication between said EP controller said electro-pneumatic brakes on each car over said EP line.

* * * * *

UNITED STATES PATENT AND TRADEMARK OFFICE
CERTIFICATE OF CORRECTION

PATENT NO. : 5,630,565
DATED : May 20, 1997
INVENTOR(S) : Anthony W. Lumbis

It is certified that error appears in the above-indentified patent and that said Letters Patent is hereby corrected as shown below:

Column 4, line 18, after "lines" insert --of a trainline--;
   Line 28, after "controller" insert --and--.

Column 4, lines 42 and 43, replace "train lines" with --trainline--.

Column 4, lines 50 and 51, replace "train lines" with --trainline--.

Column 4, line 60, replace "train lines" with --trainline--;
   Line 61, after "used" insert --control--.

Column 5, line 10, after "lines" insert --of a trainline--;

Column 6, line 9, after "controller" insert --and--.

Signed and Sealed this

Sixth Day of July, 1999

*Attest:*

Q. TODD DICKINSON

*Attesting Officer*     Acting Commissioner of Patents and Trademarks